United States Patent
Tringe

(10) Patent No.: US 6,812,117 B1
(45) Date of Patent: Nov. 2, 2004

(54) METHOD FOR CREATING A RECONFIGURABLE NANOMETER-SCALE ELECTRONIC NETWORK

(75) Inventor: Joseph W. Tringe, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/609,762

(22) Filed: Jun. 30, 2003

(51) Int. Cl.$^7$ .............................................. H01L 21/00
(52) U.S. Cl. ...................................... 438/466; 438/507
(58) Field of Search ............................... 438/466, 507, 438/1; 257/E51.04

(56) References Cited

U.S. PATENT DOCUMENTS

| | | | |
|---|---|---|---|
| 6,430,511 B1 | * | 8/2002 | Tour et al. ..................... 702/19 |
| 2002/0176276 A1 | * | 11/2002 | Zhang et al. ................ 365/151 |
| 2003/0153001 A1 | * | 8/2003 | Soane et al. .................. 435/7.1 |
| 2003/0173595 A1 | * | 9/2003 | Kuekes ......................... 257/202 |
| 2004/0039717 A1 | * | 2/2004 | Nugent ......................... 706/27 |
| 2004/0041617 A1 | * | 3/2004 | Snider et al. ................ 327/365 |
| 2004/0093575 A1 | * | 5/2004 | Heath et al. .................... 716/8 |

* cited by examiner

Primary Examiner—Richard A. Booth
(74) Attorney, Agent, or Firm—William G. Auton

(57) ABSTRACT

The present invention includes a method for creating a reconfigurable nanometer-scale electronic network. One embodiment of the invention is made up of the following steps. The first step entails depositing nanometer-scale electrically conducting islands on an insulating substrate. The next step entails engineering electrically conducting molecules to preferentially attach to the nanometer-scale electrically conducting islands, forming a semi-regular array of current-conducting elements. The next step entails selecting individual nodes for bond breaking by applying electrical currents through two orthogonal molecular filaments, this current heating both the molecules and islands raising the temperature of the current-conducting elements at individual nodes and breaking bonds in accordance with a pre-selected network design. The next step entails repeating the step of selecting individual nodes for bond breaking to produce thereby the nanometer-scale electronic network. Additional forces can be applied to the selected molecules with a magnetic field, B, in the plane of the substrate; these fields will induce outs-of-plane forces, F, on only those molecules which are carrying current.

4 Claims, 1 Drawing Sheet

METHOD FOR CREATING A RECONFIGURABLE NANOMETER-SCALE ELECTRONIC NETWORK

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to molecular electronics and more specifically to a method for creating a reconfigurable nanometer-scale electronic network for computational and sensing applications. Because of the reduced size of this network, relative to state-of-the-art lithographically-defined integrated circuits, it is anticipated that the functional network will have orders of magnitude improvement in processor speed and power consumption.

Electronic circuits are currently fabricated almost exclusively by a process in which electronic devices and interconnects are defined with photolithography. In this process, a light- or electron-sensitive thin film, typically 0.1–1 $\mu$m thick is deposited on a substrate, and then exposed to a light or electrons in a pattern which defines the boundaries of the device or interconnect. This minimum feature size definable by this process is approximately limited by the wavelength of light or the electron wavefunction, and generally is not less than a few tenths of a micron.

Prior art systems of interest are disclosed in the following three references, the disclosures of which are incorporated herein by reference:

Direct measurement of electrical transport through DNA molecules, Danny Porath, Alexey Bezryadin, Simon de Vries, Cees Dekker (Nature, vol. 403, 10 Feb. 2000)

Chemically synthesized and assembled electronics devices, Inventors: Heath; James R. (Santa Monica, Calif.); Williams; R. Stanley (Mountain View, Calif.); Kuekes; Philip J. (Menlo Park, Calif.) Assignee: Hewlett-Packard Co. (Palo Alto, Calif.) Appl. No.: 282048 Filed: Mar. 29, 1999.

Molecular-wire crossbar interconnect (MWCI) for signal routing and communications, Inventors: Kuekes; Philip J. (Menlo Park, Calif.); Williams; R. Stanley (Mountain View, Calif.); Heath;. James R. (Santa Monica, Calif.) Assignee: Hewlett-Packard Company (Palo Alto, Calif.) Appl. No.: 280225 Filed: Mar. 29, 1999.

The speed and power used by electronic circuits generally scales with the size of the electronic devices and the distance between these devices, such that the smaller circuits are faster and use less power. Because electronic devices have been getting smaller and closer together for the last thirty years, processors based on these devices have been improving in performance. However, this trend cannot continue with the present lithography-defined circuits because of the wavelength limitation on minimum feature size described previously.

It is conceivable that individual molecules could be designed in such a way that they could act as extremely small transistors, resistors, capacitors, or other needed components of a modern electronic processor. Using molecular electronic components, the trend toward smaller processors would reach its ultimate limit in terms of processing power and speed. With existing techniques such as crystallization, molecules can arranged in regular patterns, but perfectly regular arrays of devices are not useful performing calculations or other useful functions since there is no way to ensure that a particular operation occur on a given device at a given time relative to other devices in the array. There is therefore a need for a method which is capable of (1) electrically connecting molecules to one another, and (2) defining the network of connections such that the network can perform useful functions such as computation or sensing.

SUMMARY OF THE INVENTION

The present invention includes a method for creating a reconfigurable nanometer-scale electronic network. One embodiment of the invention is made up of the following steps.

The first step entails depositing nanometer-scale electrically conducting islands on an insulating substrate.

The next step entails engineering electrically conducting molecules to preferentially attach to the nanometer-scale electrically conducting islands, forming a semi-regular array of current-conducting elements.

The next step entails selecting individual nodes for bond breaking by applying electrical currents through two orthogonal molecular filaments; this current heats both the molecules and islands, raising the temperature of the current-conducting elements at individual nodes and breaking bonds in accordance with a pre-selected network design.

The next step entails repeating the step of selecting individual nodes for bond breaking to produce thereby the nanometer-scale electronic network.

This applying step is accomplished using electrical currents through two orthogonal molecular filaments; current will heat both the molecules and islands since energy/time (power), P, will be applied through the current carrying elements according to: $P=I^2R$ (where I is the current and R the resistance of the element) and this energy will not be perfectly dissipated through radiation or phonon conduction mechanisms; excess energy will be converted to heat, raising the temperature of the current-conducting elements.

Additional forces can be applied to the selected molecules with a magnetic field, B, in the plane of the substrate; these fields will induce out-of-plane forces, F, on only those molecules which are carrying current according to $F=IL\times B$ where L is a vector representing the length of the molecule.

DETAILED DESCRIPTION OF THE PREFERRED EMBODIMENT

Figure 1:
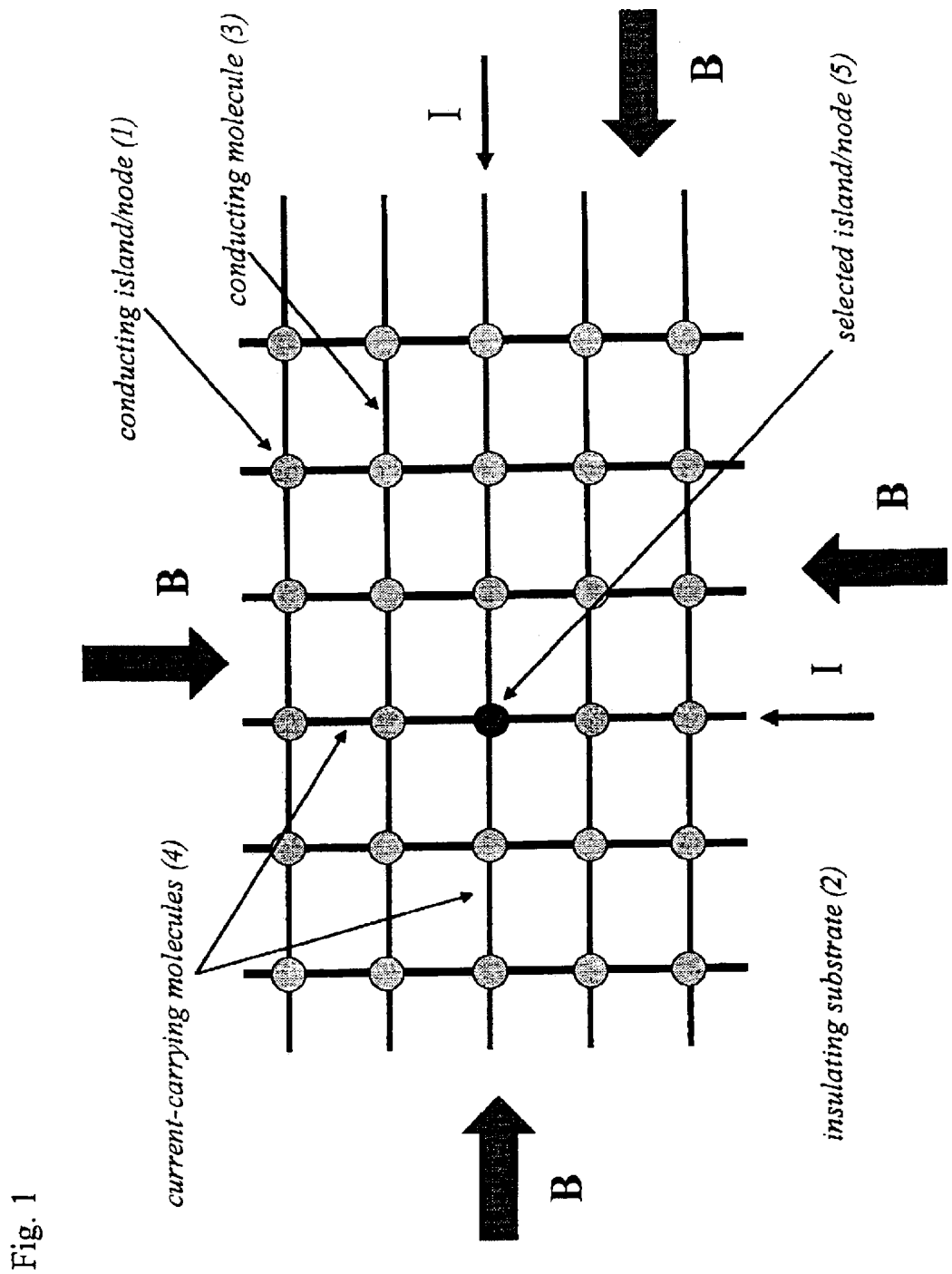
FIG. 1 is the sole FIGURE of the drawings and it illustrates the present invention.

The purpose of this invention is to define a method for creating a reconfigurable nanometer-scale electronic network for computational and sensing applications. Because of the reduced size of this network relative to state-of-the-art lithographically-defined integrated circuits, it is anticipated that the functional network will have orders of magnitude improvement in processor speed and power consumption. Further, such a network could incorporate engineered molecules with properties superior to anything achievable with larger devices or functional structures. Since the network will be adjustable by electrical signals, it can be reconfigured during use to change its function or repair faults.

The reader's attention is now directed toward FIG. 1 which shows the invention.

First, deposit nanometer-scale electrically conducting islands (part 1 in FIG. 1—yellow circles) on an insulating substrate (part 2 in FIG. 1—white background). Next, engineer electrically conducting molecules (biological or synthetic, part 3 in FIG. 1—black lines) to preferentially attach to conducting islands, forming a semi-regular array. Apply electrical currents through two orthogonal molecular filaments (part 4 in FIG. 1—red lines); this current will heat both the molecules and islands since energy/time (power), P, will be applied through the current carrying elements according to:

$$P=I^2R \qquad \text{Eq. 1}$$

(where I is the current and R the resistance of the element) and this energy will not be perfectly dissipated through radiation or phonon conduction mechanisms; excess energy will be converted to heat, raising the temperature of the current-conducting elements.

One of the islands (part 5 in FIG. 1—red circle) will experience twice the current density relative to all the other islands which are in the current path, and therefore be heated to a greater extent. The bonds which the engineered conducting molecules form to the conducting islands must be made such that the higher temperature of the island selected to receive twice the current density will be sufficient to break those bonds; the bonds must, however, be strong enough to remain intact on the islands which are experiencing a lower current density and are at lower temperatures. Additional forces can be applied to the selected molecules with a magnetic field, B, in the plane of the substrate; these fields will induce out-of-plane forces, F, on only those molecules which are carrying current according to:

$$F=IL\times B \qquad \text{Eq. 2}$$

where L is a vector representing the length of the molecule. Repeat this process of selecting individual nodes for bond breaking until the network is completely defined. Following initial definition of the array for computational or sensing applications, the array can be changed at any time in order to change the functionality of the network or to repair faults.

The advantage of using molecular electronic devices over devices defined by lithography (several orders of magnitude larger than molecules) is that the molecular devices are, in proportion to their size, faster and use less power. The advantage of the network-definition method for molecular arrays (in which nodes are addressed due to locally higher current density) over ordering methods such as crystallization is that this method is capable of creating networks of molecules which can perform functions such as computation or sensing. After the definition of the functional network, the same method may be applied to reconfigure the network in order to change its functional or perform fault repair.

As described, the method is capable only of breaking connections. An alternative process could include the capacity to make new connections, perhaps by immersing the network in a solution in which needed molecules could drift (in an electromagnetic field) or diffuse to particular nodes.

The method specifies a magnetic field as a way to provide additional stress on the molecules attached to the preferentially-heated node. Possible additional bond stress mechanisms are photons, electrons or ions aimed to strike the preferentially-heated bonds directly or indirectly.

While the invention has been described in its presently preferred embodiment it is understood that the words which have been used are works of description rather than words of limitation and that changes within the purview of the appended claims may be made without departing from the scope and spirit of the invention in its broader aspects.

What is claimed is:

1. A method for creating a reconfigurable nanometer-scale electronic network comprising the steps of: depositing nanometer-scale electrically conducting islands on a silicone dioxide insulating substrate, forming a semiregular array of current conducting elements attached to said nanometer-scale electrically conducting island;

selecting individual nodes for bond breaking by applying electrical currents through two orthogonal molecular filaments, this current heating both the molecules and islands raising a temperature of the current-conducting elements at individual nodes and breaking bonds in accordance with a preselected network design; and repeating the step of selecting individual nodes for bond breaking to produce thereby the nanometer-scale electronic network.

2. The method of claim 1, wherein the depositing step is conducted using a procedure selected from a group consisting of: evaporation, chemical vapor deposition, colloidal suspension deposition and molecular heam epitaxi.

3. The method of claim 2, wherein the deposition step comprises depositing islands a few tens of nanometers high and wide and composed by molecules including silicon and gallium arsenide said islands being deposited by evaporation.

4. A method for creating a reconfigurable nanometer-scale electronic network, as defined in claim 2, further comprising a step of having additional force applied to selected molecules with a magnetic field, B, in the plane of the substrate; these fields will induce out-of-plane forces, F, on only those molecules which are carrying current according to:

$$F=IL\times B$$

where L is a vector representing a length of the selected molecule.

* * * * *